(12) United States Patent
Platz et al.

(10) Patent No.: US 12,522,497 B2
(45) Date of Patent: Jan. 13, 2026

(54) MICRO-ELECTROMECHANICAL SYSTEM

(71) Applicant: Technische Universität Wien, Vienna (AT)

(72) Inventors: Daniel Platz, Vienna (AT); Ulrich Schmid, Vienna (AT); Jonas Hafner, Vienna (AT)

(73) Assignee: Technische Universitiit Wien, Vienna (AT)

( * ) Notice: Subject to any disclaimer, the term of this patent is extended or adjusted under 35 U.S.C. 154(b) by 299 days.

(21) Appl. No.: 18/287,721

(22) PCT Filed: Apr. 12, 2022

(86) PCT No.: PCT/AT2022/060112
§ 371 (c)(1),
(2) Date: Oct. 20, 2023

(87) PCT Pub. No.: WO2022/221895
PCT Pub. Date: Oct. 27, 2022

(65) Prior Publication Data
US 2024/0182293 A1    Jun. 6, 2024

(30) Foreign Application Priority Data
Apr. 23, 2021 (AT) .............................. A 50307/2021

(51) Int. Cl.
*B81B 3/00*  (2006.01)
*G01C 19/5712*  (2012.01)
(Continued)

(52) U.S. Cl.
CPC ........ *B81B 3/0081* (2013.01); *G01C 19/5712* (2013.01); *G01Q 60/24* (2013.01);
(Continued)

(58) Field of Classification Search
CPC .. B81B 3/0081; H10N 30/302; H10N 30/304; H10N 30/306; G01C 19/5712; G01C 19/5621
See application file for complete search history.

(56) References Cited

U.S. PATENT DOCUMENTS

| 4,338,575 A | 7/1982 | Hartemann |
| 2015/0137068 A1* | 5/2015 | Bartsch ................ H10N 30/304 257/9 |

(Continued)

FOREIGN PATENT DOCUMENTS

CN        102539827 A    7/2012

OTHER PUBLICATIONS

Mohd-Yasin et al. "Topical Review: Noise in MEMS," Measurement Science and Technology, 21, pp. 1-22, 2010.
(Continued)

*Primary Examiner* — Shane Bomar
(74) *Attorney, Agent, or Firm* — Eversheds Sutherland (US) LLP

(57) ABSTRACT

A micro-electromechanical system (1) comprising: a sensor device (2), with a measuring deformer (3) exhibiting an effective temperature T1; a high-frequency resonator (4) that is mechanically coupled to the sensor device (2) and can interact with the measuring deformer (3); an energy converter (7) that is operatively connected to the high-frequency resonator (4) and is configured to excite the high-frequency resonator (4) into a vibration state, wherein, through the interaction of the vibrating high-frequency resonator (4) with the measuring deformer (3), energy can be transferred from the measuring deformer (3) to the high-frequency resonator (4) in such a manner that the measuring deformer (3) after the energy transfer exhibits an effective temperature T2 lower than T1.

21 Claims, 1 Drawing Sheet

Figure 1:
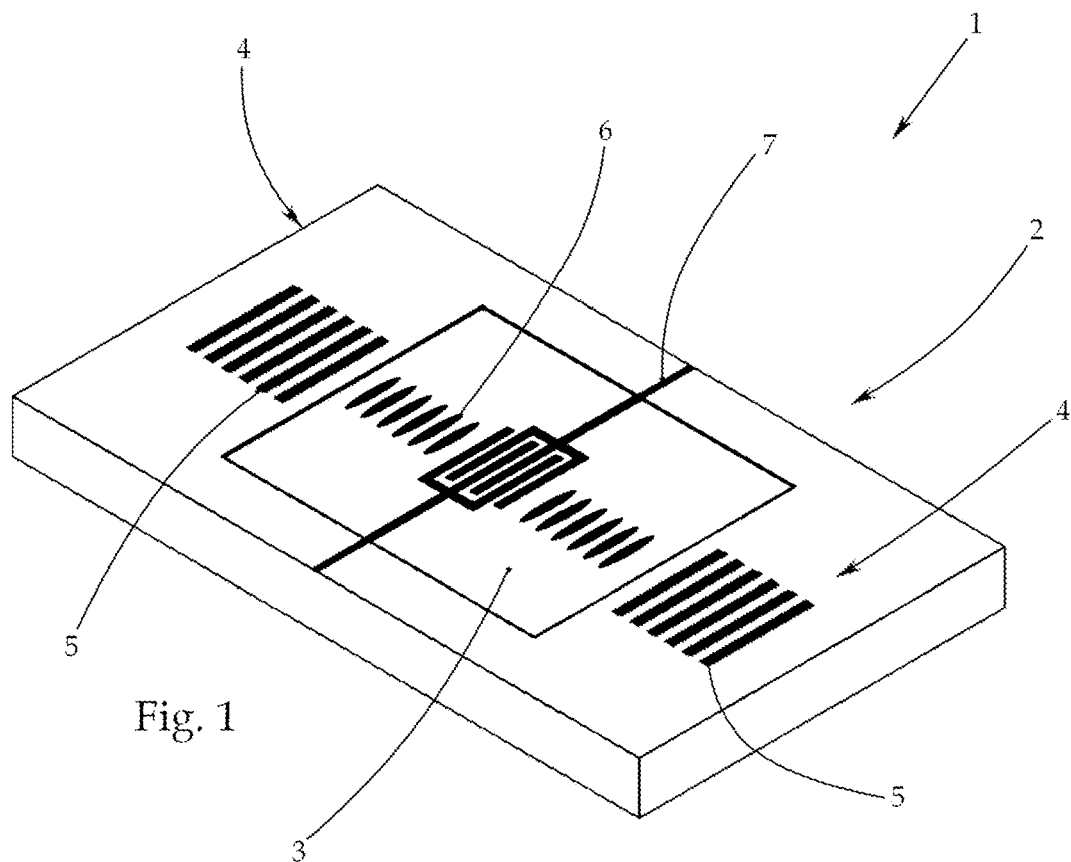

(51) Int. Cl.
G01Q 60/24 (2010.01)
H10N 30/30 (2023.01)

(52) U.S. Cl.
CPC ......... *H10N 30/302* (2023.02); *H10N 30/304* (2023.02); *B81B 2201/0235* (2013.01); *B81B 2201/0242* (2013.01); *B81B 2201/0285* (2013.01)

(56) References Cited

U.S. PATENT DOCUMENTS

| | | | | |
|---|---|---|---|---|
| 2016/0353210 | A1* | 12/2016 | Schmid | B81B 3/007 |
| 2018/0002167 | A1* | 1/2018 | Frischmuth | B81C 1/00658 |
| 2018/0179049 | A1* | 6/2018 | Jandak | H10N 30/30 |
| 2018/0279055 | A1* | 9/2018 | Dehe | H04R 1/005 |
| 2019/0149926 | A1* | 5/2019 | Dehe | H04R 7/06 |
| | | | | 381/190 |
| 2020/0309665 | A1* | 10/2020 | Schneider | G01N 15/0637 |
| 2020/0321514 | A1* | 10/2020 | Sadr | H10N 30/2042 |

OTHER PUBLICATIONS

Search Report and Written Opinion Issued in International Patent Application. No PCT/AT2022/060112 dated Jul. 4, 2022 (16 Pages).

* cited by examiner

MICRO-ELECTROMECHANICAL SYSTEM

The invention relates to a micro-electromechanical system (MEMS) comprising a sensor device comprising a measuring deformer configured to measure a physical quantity, wherein the measuring deformer is mechanically movable to measure the physical quantity, wherein the measuring deformer in a first state exhibits thermal fluctuations corresponding to an effective temperature T1.

The invention further relates to a method for manufacturing a micro-electromechanical system.

MEMS are components or assemblies whose smallest components exhibit sizes in the range of a few micrometres. A MEMS typically consists of one or more sensors, actuators and an electronic control system on a substrate or chip. The sensors of a MEMS are, for example, inertial sensors, e.g., acceleration or rotation sensors. These comprise a movable mass (a measuring deformer) attached to a frame or mount via an elastic element. These kinds of sensors are modelled as a harmonic vibrator, with a mass m, a spring constant k, a quality factor Q and a resonant frequency $\Omega$. The position of the movable mass is typically captured capacitively or by piezoelectric means. MEMS sensors can be operated in a quasistatic or a resonant regime, wherein the quasistatic regime is used more frequently. In this regime, signals are measured that have a frequency below the resonant frequency $\Omega$. In order to guarantee a highest possible resolution of MEMS sensors, it is necessary for a detection of the deflection of the movable mass to be as sensitive as possible. The measurement accuracy or resolution of the sensor can be increased, inter alia, by reducing the thermal noise (or thermal fluctuations) of the movable mass. So-called cavity optomechanical accelerometers, which comprise optical resonators, constitute a known option for reducing the thermal noise or the thermal fluctuations of the movable mass of sensors. These are shown, for example, in "Krause, A. G., Winger, M., Blasius, T. D., Lin, Q., Painter, O.: *A high-resolution microchip optomechanical accelerometer. Nature Photonics* 6(11), 768-772 (2012)". With these sensors, however, it is necessary to mount optical resonators on the sensors, which leads to a significant increase in the complexity of the technical design of the sensor. Opto-mechanical systems are thus not feasible for use with MEMS sensors.

The object of the present invention is to attenuate or eliminate the drawbacks of the prior art. The aim of the invention is thus in particular to provide a MEMS with which measurement accuracy is increased in a simple and feasible manner.

This object is achieved by a MEMS with the features of claim 1 and a method with the features of claim 15. Preferred embodiments are indicated in the dependent claims.

According to the invention, the MEMS includes a high-frequency resonator that is mechanically coupled to the sensor device, wherein by means of the coupling the high-frequency resonator can interact with the measuring deformer of the sensor device, wherein the high-frequency resonator is configured as a mechanical high-frequency resonator, wherein the micro-electromechanical system includes an energy converter that is operatively connected to the high-frequency resonator, wherein the energy converter is configured so that the high-frequency resonator can be excited into a first vibration state by the energy converter, wherein the high-frequency resonator has a transition frequency in the excited first vibration state, wherein, through the interaction of the high-frequency resonator vibrating at the transition frequency with the measuring deformer of the sensor device, energy can be transferred from the measuring deformer to the high-frequency resonator in such a manner that the measuring deformer after the energy transfer exhibits a second state in which the measuring deformer exhibits thermal fluctuations corresponding to an effective temperature T2 lower than T1.

This yields the advantage that thermal fluctuations or thermal noise is reduced by the interaction of the high-frequency resonator with the measuring deformer. The reduction of thermal fluctuations accordingly occurs through the interaction of the measuring deformer with a mechanical vibration system. In contrast to opto-mechanical systems, the latter can be coupled to a measuring deformer easily and inexpensively. Preferably, the first vibration state is different from the second vibration state. In particular, the first vibration state has a different frequency than the second vibration state. The transition frequency can also be called transfer frequency and is the frequency at which phonons transition from a low-frequency mode exhibited by the measuring deformer to a high-frequency mode exhibited by the high-frequency resonator. The transition frequency is in particular chosen in such a manner that there occurs a transfer of energy from the measuring deformer to the high-frequency resonator. The energy transfer or phonon transfer leads to a "cooling" of the measuring deformer, or in other words, to a reduction in thermal fluctuations, which are characterised by an effective temperature. By reducing the thermal fluctuations, the noise of the sensor device of the MEMS is reduced so that its measurement accuracy is increased. The transition frequency is preferably different from the resonant frequency of the measuring deformer. The energy converter can include a piezoelectric material or piezoelectric thin films for excitation. The piezoelectric material can have a thickness of, for example, 100 nm to 50 μm. The piezoelectric material can be supplied with energy by means of an electrode structure. The high-frequency resonator can also be excited by means of capacitive excitation.

It can be provided that, during the energy transfer from the measuring deformer to the high-frequency resonator, phonons are transferred from first modes to second modes, wherein the first modes have a lower frequency than the second modes, wherein the measuring deformer exhibits the first modes and the high-frequency resonator exhibits the second modes. By means of the phonon transfer, it is possible to achieve a reduction of the effective temperature of the measuring deformer.

It can be provided that the energy converter is configured so that the high-frequency resonator can be excited by the energy converter into a second vibration state, wherein the high-frequency resonator in the excited second vibration state has a readout frequency that is preferably different from the transition frequency, wherein, through the interaction of the high-frequency resonator vibrating at the readout frequency with the measuring deformer of the sensor device, a deflection of the measuring deformer can be measured with the high-frequency resonator. The readout frequency can also be equal to the transition frequency. The excitation of the high-frequency resonator into the second vibration state is preferably an alternative to the excitation of the high-frequency resonator into the first vibration state. The micro-electromechanical system can preferably be operated in two different operating states, wherein in a first operating state the excitation of the high-frequency resonator occurs at the transition frequency. In a second operating state, the excitation of the high-frequency resonator can occur at the readout frequency. The first operating state is preferably provided for reducing the thermal fluctuations of the measuring deformer and the second operating state is preferably provided for measuring the position of the measuring deformer. In other words, the second operating state is in particular a state in which the MEMS can carry out a cavity-assisted readout.

It can be provided that the high-frequency resonator at least partially overlaps with the measuring deformer of the sensor device. The interaction between the high-frequency resonator and the measuring deformer can thereby be achieved with a particularly simple design. Preferably, the high-frequency resonator and the measuring deformer respectively include an overlap area over which the high-frequency resonator overlaps with the measuring deformer. A mechanical connection between the high-frequency resonator and the measuring deformer can be produced through the overlap area. In particular, the high-frequency resonator can contact the measuring deformer at the overlap area.

It can be provided that the excitation of the high-frequency resonator by the energy converter occurs in a range with a lower limit value of essentially at least 10 kHz, preferably 1 MHz, more preferably 100 MHz, particularly preferably 1 GHz, and with an upper limit value of essentially at most 1000 GHz, preferably 100 GHz, more preferably 10 GHz. Advantageously, these frequency ranges are employed in numerous sensors that are used in a variety of technical fields, whereby the MEMS according to the invention has a particularly broad range of application.

It can be provided that the energy converter is configured to excite the high-frequency resonator in such a manner that surface-acoustic waves are formed on a surface of the measuring deformer by means of the excitation with the energy converter. Preferably, the surface-acoustic waves have a frequency that is different from the resonant frequency of the high-frequency resonator and/or the resonant frequency of the measuring deformer. Preferably, the surface-acoustic waves are formed on the surface of the measuring deformer that moves mechanically or undergoes a change in position when a physical quantity is measured with the sensor device. Preferably, the excitation of the high-frequency resonator by the energy converter occurs in the second operating state, in which the high-frequency resonator can be excited into the second vibration state (at the readout frequency), in such a manner that the surface-acoustic waves have a frequency equal to the resonant frequency of the high-frequency resonator or equal to the resonant frequency of the measuring deformer.

It can be provided that the energy converter is configured to excite the high-frequency resonator in such a manner that bulk modes are formed in the measuring deformer by means of the excitation with the energy converter. Preferably, the bulk modes have a frequency that is different from the resonant frequency of the high-frequency resonator and/or the resonant frequency of the measuring deformer.

It can be provided that the sensor device is configured as an inertial sensor. The reduction of thermal fluctuations or thermal noise is particularly important for inertial sensors. The inertial sensor can comprise, for example, an accelerometer, a vibration sensor, a rotation-rate sensor or a gyroscope.

It can be provided that the sensor device comprises an accelerometer with a test mass.

It can be provided that the high-frequency resonator is coupled to the test mass of the accelerometer to transmit vibrations. Reducing the thermal noise of the test mass of the accelerometer yields the advantage that the measurement accuracy of the accelerometer can be increased.

It can be provided that the high-frequency resonator and the test mass are configured as one piece and the energy converter is operatively connected to the test mass in such a manner that the energy converter excites the test mass at the transition frequency and bulk modes are formed in the test mass by the excitation. The bulk modes can have a frequency that is different from the resonant frequency of the high-frequency resonator and/or the test mass.

It can be provided that the sensor device comprises a gyroscope.

It can be provided that the sensor device comprises a cantilever for an atomic force microscope. In particular, the measuring deformer is configured as a cantilever. The sensor device can be configured as a gravimeter.

It can be provided that the high-frequency resonator contacts a surface of the measuring deformer of the sensor device. An easy and direct transmission of energy from the measuring deformer to the high-frequency resonator can occur by means of the contact in order to efficiently reduce the thermal noise of the measuring deformer.

It can be provided that the measuring deformer is set into a vibration during measurement that is lower than the transition frequency. It can also be provided that the measuring deformer is set into a vibration during measurement that is lower than the readout frequency.

According to the invention, a method for manufacturing a micro-electromechanical system is provided, wherein the method comprises the following steps:

providing a substrate;

manufacturing a first microstructure on the substrate, wherein the first microstructure comprises a sensor device comprising a measuring deformer configured to measure a physical quantity, wherein the measuring deformer is mechanically movable to measure the physical quantity, manufacturing a second microstructure on at least a portion of the first microstructure, wherein the second microstructure comprises a high-frequency resonator that is mechanically coupled to the sensor device, wherein by means of the coupling the high-frequency resonator can interact with the sensor device, providing an energy converter, which is arranged on the first or second microstructure or on the substrate, wherein the energy converter is operatively connected to the high-frequency resonator and is configured to excite the high-frequency resonator into a first or second vibration state, wherein the high-frequency resonator has a transition frequency in the first vibration state, wherein, by means of the interaction of the excited high-frequency resonator with the sensor device, energy of the sensor device can be transferred to the high-frequency resonator.

The interaction of the excited high-frequency resonator occurs in particular with the measuring deformer of the sensor device. The individual steps of the method according to the invention are performed by means of standard devices and tools in semiconductor technology, which are known to a person skilled in the art in the field of semiconductor technology.

It can be provided that the substrate is configured as a wafer. The wafer is preferably a silicon wafer.

It can be provided that the first and second microstructures are manufactured using a photolithography process. Preferably, the first microstructure is also manufactured using a photolithography process.

In the context of this description, the terms 'top', 'bottom', 'horizontal', 'vertical' are to be understood as orientational indications when the micro-electromechanical system is arranged in the normal position of use.

The invention is explained further in the following based on a preferred example embodiment, to which, however, it is not intended to limit the invention. The drawings show:

FIG. 1 a first example embodiment of a MEMS according to the invention; and

Figure 2:
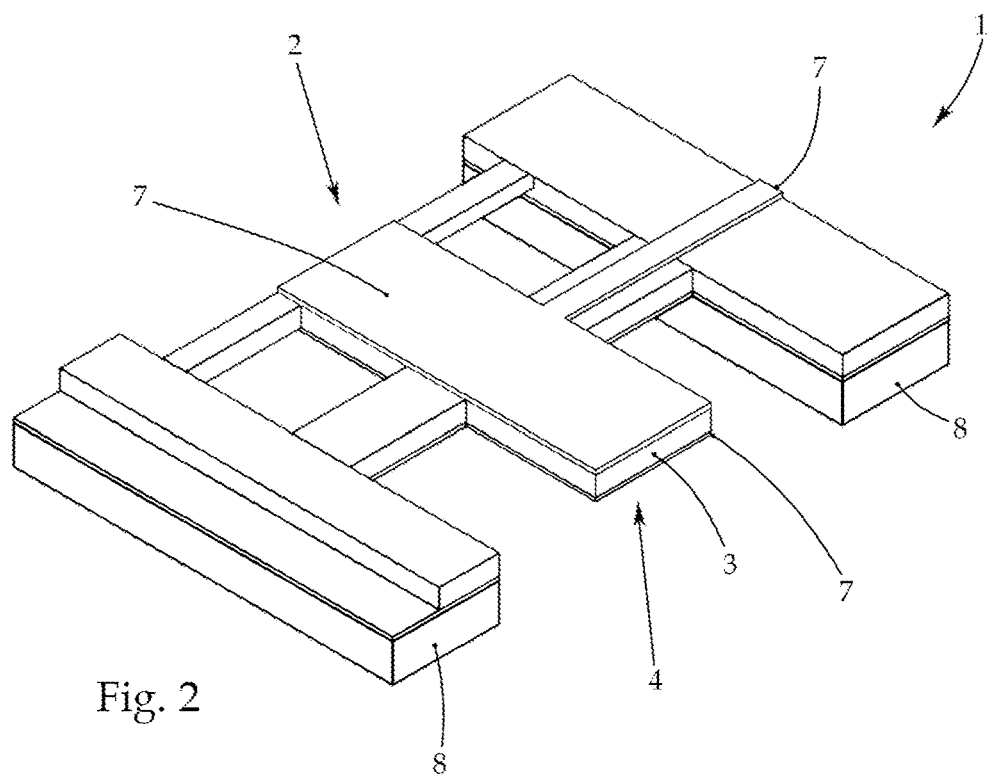

FIG. 2 a second example embodiment of a MEMS according to the invention.

FIG. 1 shows an example embodiment of a MEMS 1 according to the invention, with a sensor device 2 comprising a measuring deformer 3 configured to measure a physical quantity. The measuring deformer 3 is mechanically movable to measure the physical quantity, wherein the measuring deformer 3 exhibits thermal fluctuations corresponding to an effective temperature T1 in a first state. In the example embodiment shown, the measuring deformer 3 is a diaphragm.

The MEMS 1 comprises a high-frequency resonator 4 mechanically coupled to the sensor device 2, wherein by means of the coupling the high-frequency resonator 4 can interact with the measuring deformer 3 of the sensor device 2. The high-frequency resonator 4 is configured as a mechanical high-frequency resonator 4. In the example embodiment shown, the high-frequency resonator 4 is formed by Bragg reflectors 5 between which surface-acoustic waves 6 are formed, wherein these surface-acoustic waves 6 are formed on the surface of the measuring deformer 3 (the diaphragm).

The MEMS 1 includes an energy converter 7 that is operatively connected to the high-frequency resonator 4 and is configured to excite the high-frequency resonator 4 into a first vibration state, wherein the high-frequency resonator 4 has a transition frequency in the excited first vibration state. In the example embodiment shown, the energy converter 7 is an interdigital transducer.

By means of the interaction of the high-frequency resonator 4 vibrating at the transition frequency with the measuring deformer 3 of the sensor device 2, energy can be transferred from the measuring deformer 3 to the high-frequency resonator 4 in such a manner that the measuring deformer 3 after the energy transfer exhibits a second state in which the measuring deformer 3 exhibits thermal fluctuations corresponding to an effective temperature T2. The temperature T2 is lower than T1. The measuring deformer 3 thus exhibits lower thermal fluctuations or a reduced thermal noise due to the interaction with the high-frequency resonator 4.

During the energy transfer from the measuring deformer 3 to the high-frequency resonator 4, phonons are transferred from first modes (at the measuring deformer) to second modes (at the high-frequency resonator), wherein the first modes have a lower frequency than the second modes.

FIG. 2 shows a second example embodiment of a MEMS 1 according to the invention, wherein the measuring deformer 3 is configured as a vibratable beam. The measuring deformer 3 is made of a piezoelectric material and the energy converter 7 comprises two electrodes, wherein one electrode is arranged vertically above and one electrode is arranged vertically below the measuring deformer 3. The electrodes of the measuring deformer 7 are configured to excite the piezoelectric material to vibration. In the example embodiment shown, bulk modes are formed in the measuring deformer 3. The lower electrode of the energy converter is arranged on a substrate 8.

In this example embodiment, the high-frequency resonator 4 and the measuring deformer 3 are configured as one piece and the energy converter 7 is operatively connected to the measuring deformer 3 in such a manner that the energy converter 7 excites the measuring deformer 3, wherein bulk modes at the transition frequency or readout frequency are formed in the measuring deformer 3 by the excitation.

The invention claimed is:

1. A micro-electromechanical system (1) comprising:
   a sensor device (2) comprising a measuring deformer (3) configured to measure a physical quantity, wherein the measuring deformer (3) is mechanically movable to measure the physical quantity, wherein the measuring deformer (3) in a first state exhibits thermal fluctuations corresponding to an effective temperature T1; and
   a high-frequency resonator (4) mechanically coupled to the sensor device (2), wherein by means of the coupling the high-frequency resonator (4) can interact with the measuring deformer (3) of the sensor device (2),
   wherein the high-frequency resonator (4) is configured as a mechanical high-frequency resonator (4),
   wherein the micro-electromechanical system (1) includes an energy converter (7) that is operatively connected to the high-frequency resonator (4), wherein the energy converter (7) is configured so that the high-frequency resonator (4) can be excited into a first vibration state by the energy converter (7), wherein the high-frequency resonator (4) has a transition frequency in the excited first vibration state, and
   wherein, through the interaction of the high-frequency resonator (4) vibrating at the transition frequency with the measuring deformer (3) of the sensor device (2), energy can be transferred from the measuring deformer (3) to the high-frequency resonator (4) in such a manner that the measuring deformer (3) after the energy transfer exhibits a second state in which the measuring deformer (3) exhibits thermal fluctuations corresponding to an effective temperature T2 lower than T1.

2. The micro-electromechanical system (1) according to claim 1, wherein, during the energy transfer from the measuring deformer (3) to the high-frequency resonator (4), phonons are transferred from first modes to second modes, wherein the first modes have a lower frequency than the second modes, wherein the measuring deformer (3) exhibits the first modes and the high-frequency resonator (4) exhibits the second modes.

3. The micro-electromechanical system (1) according to claim 1, wherein the energy converter (7) is configured so that the high-frequency resonator (4) can be excited into a second vibration state by the energy converter (7), wherein the high-frequency resonator (4) in the excited second vibration state has a readout frequency that is different from the transition frequency, wherein, through the interaction of the high-frequency resonator (4) vibrating in the readout frequency with the measuring deformer (3) of the sensor device, a deflection of the measuring deformer (3) can be measured with the high-frequency resonator (4).

4. The micro-electromechanical system (1) according to claim 1, wherein the high-frequency resonator (4) at least partially overlaps with the measuring deformer (3) of the sensor device (2).

5. The micro-electromechanical system (1) according to claim 1, wherein the excitation of the high-frequency resonator (4) by the energy converter (7) occurs in a range with a lower limit value of at least 10 kHz, and with an upper limit value of at most 1000 GHz.

6. The micro-electromechanical system (1) according to claim 1, wherein the energy converter (7) is configured to excite the high-frequency resonator (4) in such a manner that surface-acoustic waves are formed on a surface of the measuring deformer (3) by the excitation with the energy converter (7).

7. The micro-electromechanical system (1) according to claim 1, wherein the energy converter (7) is configured to excite the high-frequency resonator (4) in such a manner that bulk modes are formed in the measuring deformer (3) by the excitation with the energy converter (7).

8. The micro-electromechanical system (1) according to claim 1, wherein the sensor device (2) is configured as an inertial sensor.

9. The micro-electromechanical system (1) according to claim 1, wherein the sensor device (2) comprises an accelerometer with a test mass.

10. The micro-electromechanical system (1) according to claim 9, wherein the high-frequency resonator (4) is coupled to the test mass of the accelerometer to transmit vibrations.

11. The micro-electromechanical system (1) according to claim 9, wherein the high-frequency resonator (4) and the test mass are configured as one piece and the energy converter (7) is operatively connected to the test mass in such a manner that the energy converter (7) excites the test mass at the transition frequency and bulk modes are formed in the test mass by the excitation.

12. The micro-electromechanical system (1) according to claim 1, wherein the sensor device (2) comprises a gyroscope.

13. The micro-electromechanical system (1) according to claim 1, wherein the sensor device (2) comprises a cantilever for an atomic force microscope.

14. The micro-electromechanical system (1) according to claim 1, wherein the high-frequency resonator (4) contacts a surface of the measuring deformer (3) of the sensor device (2).

15. The micro-electromechanical system (1) according to claim 1, wherein the measuring deformer (3) is set into a vibration during measurement that is lower than the transition frequency.

16. A method for manufacturing a micro-electromechanical system (1), wherein the method comprises the following steps:

providing a substrate;

manufacturing a first microstructure on the substrate, wherein the first microstructure comprises a sensor device (2) comprising a measuring deformer (3) configured to measure a physical quantity, wherein the measuring deformer (3) is mechanically movable to measure the physical quantity;

manufacturing a second microstructure on at least a portion of the first microstructure, wherein the second microstructure comprises a high-frequency resonator (4) that is mechanically coupled to the sensor device (2), wherein by means of the coupling the high-frequency resonator (4) can interact with the sensor device (2); and providing an energy converter (7), which is arranged on the first or second microstructure or on the substrate, wherein the energy converter (7) is operatively connected to the high-frequency resonator (4) and is configured to excite the high-frequency resonator (4) into a first or second vibration state, wherein the high-frequency resonator (4) has a transition frequency in the first vibration state, wherein energy of the sensor device (2) can be transferred to the high-frequency resonator (4) through the interaction of the excited high-frequency resonator (4) with the sensor device (2).

17. The method according to claim 16, wherein the substrate is configured as a wafer.

18. The method according to claim 16, wherein the first and second microstructures are manufactured using a photolithography process.

19. The micro-electromechanical system (1) according to claim 5, wherein the lower limit value is at least 1 MHz, and/or the upper limit value is at most 100 GHz.

20. The micro-electromechanical system (1) according to claim 5, wherein the lower limit value is at least 100 MHz, and/or the upper limit value is at most 10 GHz.

21. The micro-electromechanical system (1) according to claim 5, wherein the lower limit value is at least 1 GHz.

* * * * *